(12) United States Patent
Cho et al.

(10) Patent No.: US 8,995,060 B2
(45) Date of Patent: Mar. 31, 2015

(54) OPTICAL FILM AND HEAD-UP DISPLAY DEVICE

(71) Applicant: National Applied Research Laboratories, Taipei (TW)

(72) Inventors: Wen-Hao Cho, Taipei (TW); Bo-Huei Liao, Taipei (TW); Donyau Chiang, Taipei (TW); Cheng-Chung Lee, Taipei (TW)

(73) Assignee: National Applied Research Laboratories, Taipei (TW)

( * ) Notice: Subject to any disclaimer, the term of this patent is extended or adjusted under 35 U.S.C. 154(b) by 146 days.

(21) Appl. No.: 13/727,588

(22) Filed: Dec. 26, 2012

(65) Prior Publication Data

US 2013/0182330 A1    Jul. 18, 2013

(30) Foreign Application Priority Data

Jan. 17, 2012    (TW) .............................. 101101826 A

(51) Int. Cl.
  *G02B 5/00*    (2006.01)
  *G02B 5/02*    (2006.01)
  *G02B 27/01*   (2006.01)

(52) U.S. Cl.
  CPC .......... *G02B 5/0289* (2013.01); *G02B 27/0101* (2013.01); *G02B 2027/0118* (2013.01)
  USPC .......... 359/599; 359/452; 359/453; 359/455; 359/466; 349/96; 349/117

(58) Field of Classification Search
  CPC .......... G02B 27/0101; G02B 27/0118; G02B 5/0289; G02B 5/0278
  USPC ............... 356/141.2, 218; 359/599, 452, 453, 359/455, 456; 438/66; 349/56, 84, 112, 96, 349/117
  See application file for complete search history.

(56) References Cited

U.S. PATENT DOCUMENTS

2010/0283998 A1* 11/2010 Souchkov et al. ......... 356/141.2

* cited by examiner

*Primary Examiner* — Suchin Parihar
*Assistant Examiner* — William R Alexander
(74) *Attorney, Agent, or Firm* — Cheng-Ju Chiang

(57) ABSTRACT

A head-up display device includes an image module, a substrate, and an optical film. The image module has an emitting source, wherein the emitting source transmits at least one image. The substrate is disposed corresponding to the image module. The optical film is disposed on the substrate and includes at least one transmission layer, wherein each transmission layer has a plurality of transmitting column structures obliquely arranged side by side, and a longitudinal direction of the transmitting column structure has a tilt angle with respect to a normal of the substrate. The at least one image is transmitted to the optical film, and the obliquely disposed transmitting column structures cause the at least one image to scatter on the optical film.

15 Claims, 7 Drawing Sheets

OPTICAL FILM AND HEAD-UP DISPLAY DEVICE

BACKGROUND OF THE INVENTION

1. Field of the Invention

The present invention relates generally to an optical film and a head-up display device having the same; particularly, the present invention relates to an optical film and a head-up display device having the same that can scatter images and increase the transmittance of external light.

2. Description of the Prior Art

Recently, more and more people area driving vehicles, and thus the expectation of vehicle equipment is getting higher and higher. Generally, driver watches the front road condition through windshield and gets information of vehicle condition from dashboard. However, the driver cannot pay attention to the front road condition while lowering his/her head and watching the dashboard. For instance, the driver cannot pay attention to both road condition and information of vehicle condition when the vehicle is moving at a very high speed.

Actually, current vehicle manufacturers utilize head-up display for aircraft on vehicles, so that drivers can get the information of vehicle condition without lowering their head. Particularly, the head-up display projects an image of the vehicle condition information on a coating film, which is disposed on the windshield. It is noted that the coating film can reflect the image of vehicle condition information and also allow external light to be transmitted therethrough.

However, the coating film generally does not have a preferable display effect. In practical applications, the transmittance of the coating film is not optimized, so that it is difficult for the driver to clearly watch the front road condition. In addition, part of the vehicle condition image is reflected on the coating film, and the rest part of the vehicle condition image is transmitted through the coating film. It is noted that the transmitted image is refracted on the inner surface of windshield and is reflected on the outer surface of windshield to be transmitted through the coating film because the windshield has a certain thickness, so that the driver will see two overlapping images. In addition, the vehicle condition image is reflected by the coating film to the eyes of the driver. In other words, the driver receives two reflected images. Once different drivers having different height use the head-up display, the driver needs to adjust the position and the laminating angle of the coating film on the windshield, so that the reflected images can totally transmitted to the view of the driver. For the above reasons, the conventional head-up display still has many defects.

SUMMARY OF THE INVENTION

In view of prior art, the present invention provides an optical film and a head-up display having the optical film, which can enhance the transmittance and improve the display effect.

It is an object of the present invention to provide an optical film having transmitting column structures capable of scattering images to enhance the image quality.

It is an object of the present invention to provide a head-up display device having the optical film to enhance the transmittance.

The present invention provides an optical film, wherein the optical film is applied to a substrate of a head-up display device and includes at least one transmission layer. It is noted that each transmission layer has a plurality of transmitting column structures obliquely arranged side by side, and a longitudinal direction of the transmitting column structure has a tilt angle with respect to a normal of the substrate. It is noted that a range of the tilt angle is between 20° and 80°; particularly, the range of the tilt angle is preferably between 40° and 60°.

It is noted that an external diameter of the transmitting column structure is preferably in a range of the wavelength of visible light, so that visible light can be scattered on the transmitting column structures. In other words, the transmitting column structures cause visible light to scatter on the optical film when the visible light is incident to the transmitting column structures.

The present invention provides a head-up display device, wherein the head-up display device includes the optical film described above, an image module, and the substrate. In practical applications, the image module transmits at least one image to the optical film, and the obliquely disposed transmitting column structures cause the at least one image to scatter on the optical film.

Compared to the prior arts, the optical film and the head-up display device having the optical film of the present invention utilizes the transmitting column structures to scatter the light, wherein the external diameter of the transmitting column structure is in the range of the wavelength of visible light, so that the light is scattered on the transmitting column structures. In addition, the external light transmits through the transmitting column structures along a direction almost parallel to the longitudinal direction of the transmitting column structures as the transmitting column structures and the substrate have the tilt angle, further enhancing the transmittance.

The detailed descriptions and the drawings thereof below provide further understanding about the advantage and the spirit of the present invention.

DETAILED DESCRIPTION OF THE PREFERRED EMBODIMENT

According to an embodiment of the present invention, an optical film is provided to enhance the transmittance.

Figure 1:
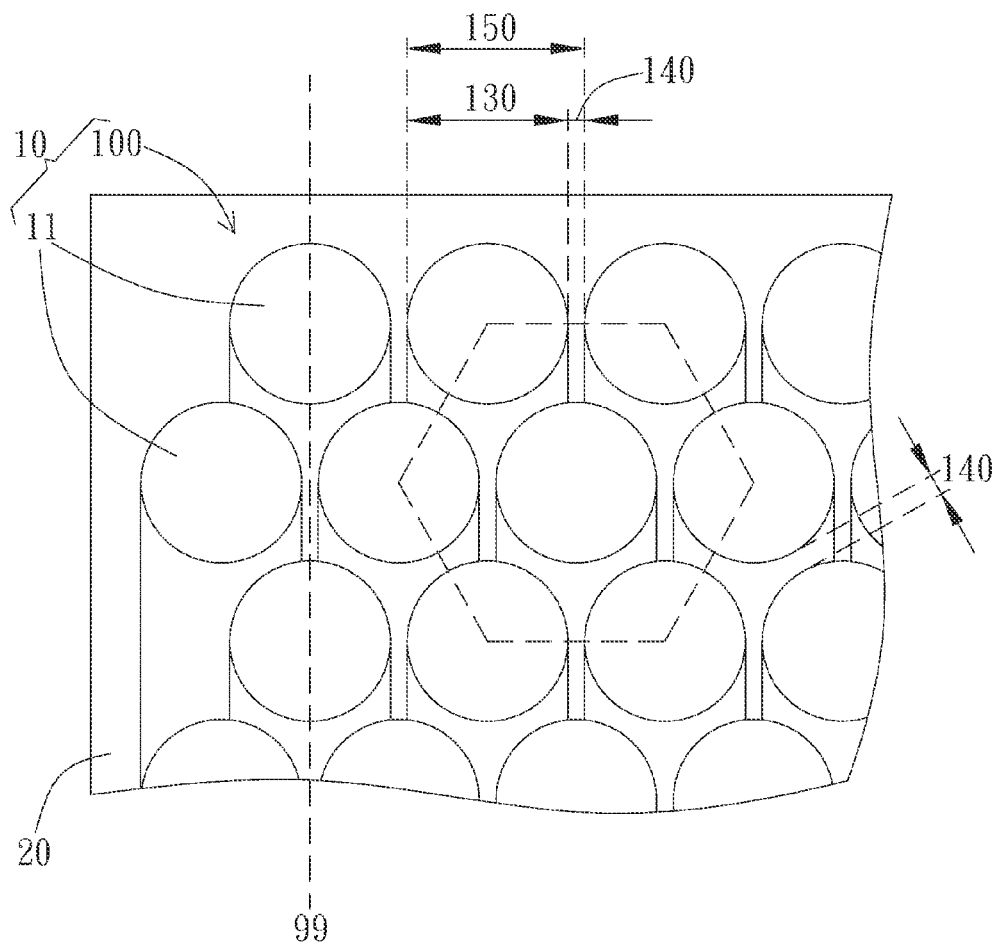
FIG. 1 is a top view of an embodiment of the optical film of the present invention.
Figure 2:
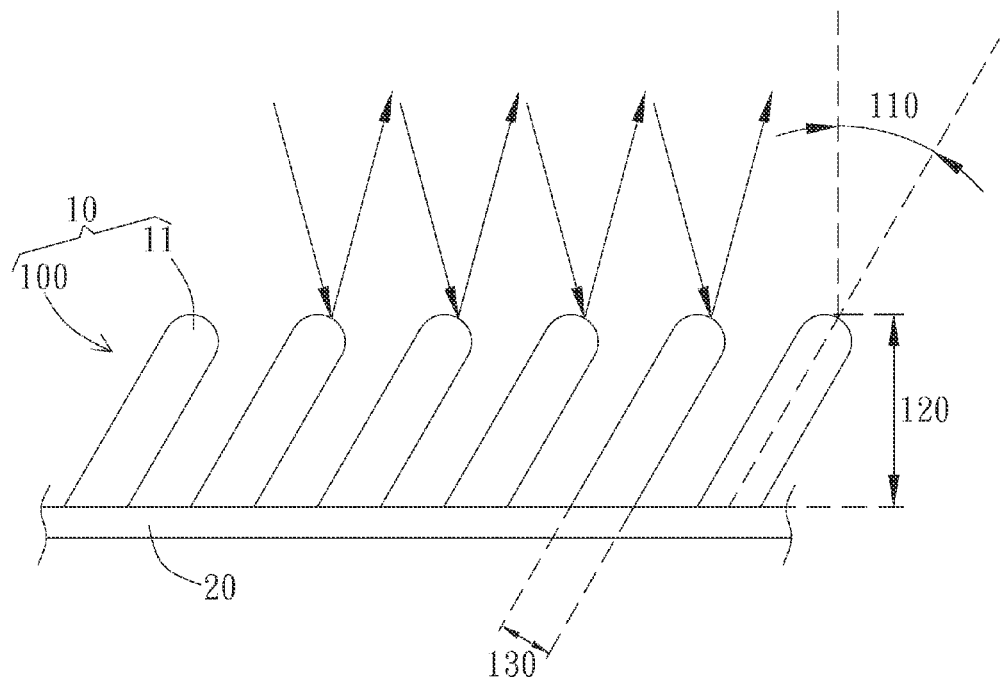
FIG. 2 is a cross-sectional view of the embodiment of FIG. 1 along the cross-section line 99.

Please refer to FIGS. 1 and 2; FIG. 1 is a top view of an embodiment of the optical film of the present invention, and FIG. 2 is a cross-sectional view of the embodiment of FIG. 1 along the cross-section line 99. In the embodiment, the optical film 10 is applied to a substrate of a head-up display device, wherein material of the substrate 20 can be plastic, glass, or other transparent materials, but is not limited to the embodiment. As shown in FIG. 1, the optical film 10 is formed on the substrate 20 and includes at least one transmission layer 100.

Figure 3:
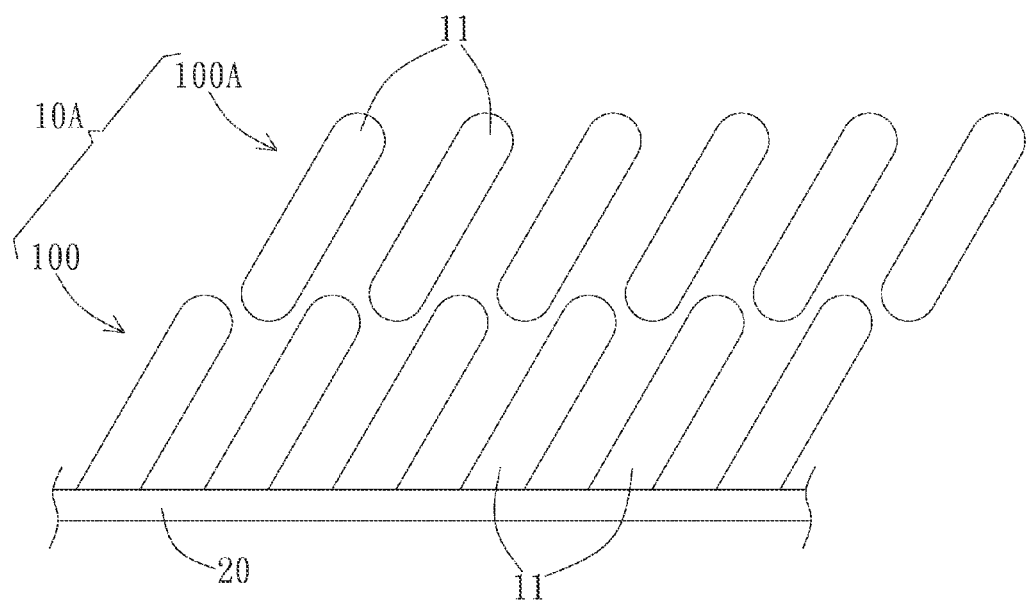
FIG. 3 is a cross-sectional view of another embodiment of the optical film of the present invention.

Please refer to FIG. 3. FIG. 3 is a cross-sectional view of another embodiment of the optical film of the present invention. As shown in FIG. 3, the optical film 10A has a plurality of transmitting layers, wherein the transmitting layers are disposed in a stack manner. That is, the transmitting layers are disposed on the substrate 20 in a stack manner. In the embodiment, the optical film 10A has a transmitting layer 100 and a transmitting layer 100A, wherein the transmitting layer 100 and the transmitting layer 100A are disposed on the substrate 20 in a stack manner. It is noted that the amount of the stacked transmitting layers can be varied according to practical applications, but is not limited to the embodiment.

Please refer to FIGS. 1 and 2, wherein each transmission layer 100 has a plurality of transmitting column structures 11 obliquely arranged side by side. In other words, the transmitting column structures 11 are obliquely formed on each transmitting layer. In the embodiment, material of the transmitting column structure is preferably selected from transparent materials. For instance, material of the transmitting column structures 11 includes oxide, fluoride, nitride, or any combination thereof. In the embodiment, the material of the transmitting column structures 11 is aluminum oxide ($Al_2O_3$).

In addition, the transmitting column structures 11 are formed by periodic molding process, oblique evaporation, oblique sputtering, or other manufacturing processes. In the embodiment, the transmitting column structures 11 are formed from a plurality of nanospheres on the substrate 20, and the adjacent nanospheres are disposed at a pitch and arranged as a periodic structure. In addition, the transmitting column structures 11 are formed from the nanospheres by oblique evaporation, but the manufacturing process is not limited to the embodiment.

As shown in FIG. 1, the external diameter 130 of the transmitting column structure 11 is in a range between 300 nm and 800 nm. It is noted that the wavelength of visible light is also in a range between 300 nm and 800 nm. That is, the external diameter 130 of the transmitting column structure 11 is in a range the same as the wavelength of visible light, so that the visible light can be scattered on the transmitting column structures 11. In the embodiment, the external diameter 130 is 500 nm, but is not limit to the embodiment.

Figure 4:
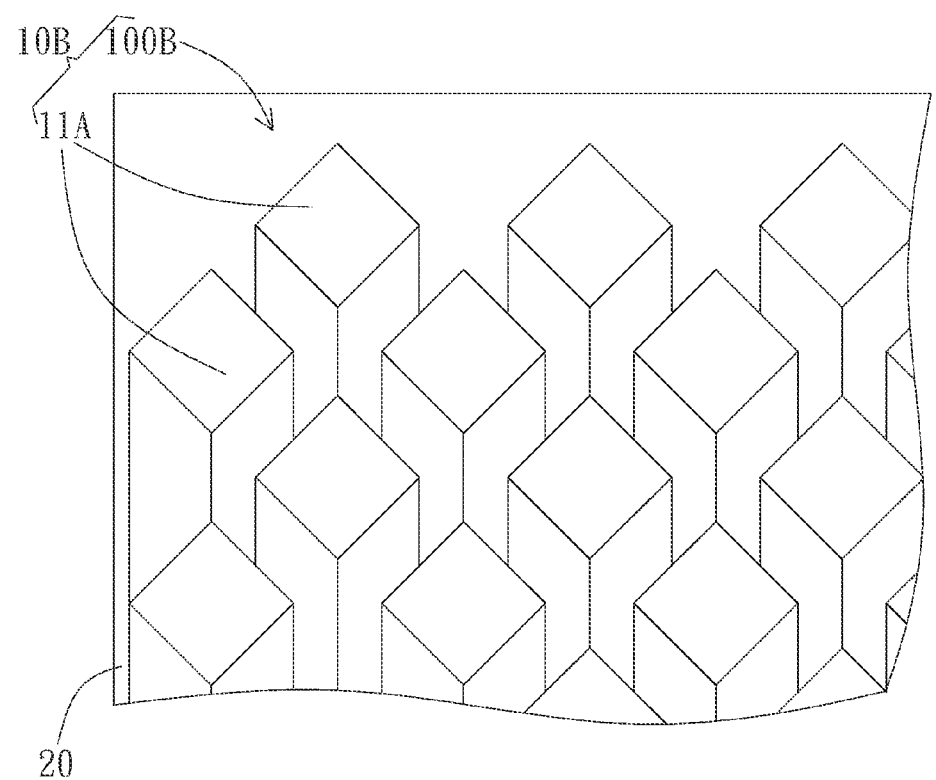
FIG. 4 is a top view of another embodiment of the optical film of the present invention.

It is noted that the shape of the transmitting column structure 11 includes circular column, square column, rectangular column, polygonal column, or any combination thereof, but is not limited thereto. As shown in FIG. 1, the shape of the transmitting column structure 11 is circular column. In addition, please refer to FIG. 4. FIG. 4 is a top view of another embodiment of the optical film of the present invention. As shown in FIG. 4, the optical film 10B includes a transmitting layer 100B, wherein the transmitting layer 100B has a plurality of transmitting column structures 11A, wherein the shape of the transmitting column structure 11 is a square column. In other embodiments, the optical film can have a plurality of transmitting column structures having different shapes, but is not limited thereto.

In practical applications, the transmitting column structures 11 are disposed in a hexagonal close-packed arrangement, a rectangular arrangement, or a diamond arrangement. As shown in FIG. 1, every six transmitting column structures 11 surround one transmitting column structure 11. That is, the transmitting column structures 11 are disposed in the hexagonal close-packed arrangement. In addition, as shown in FIG. 4, the transmitting column structures 11A in the transmission layer 100B are disposed in the rectangular arrangement. In other embodiments, the optical film can have different arrangements of the transmitting column structures. The arrangement of the transmitting column structures is not limited to the embodiment.

With regard to the arrangement relation between the transmitting column structures 11, adjacent transmitting column structures 11 can have a same spacing or a different spacing. As shown in FIG. 1, the adjacent transmitting column structures 11 have a same spacing 140. It is noted that the adjacent transmitting column structures 11 are disposed at a pitch (width) 150, wherein the pitch 150 is a sum of the spacing 140 and the external diameter 130 and is between 300 nm and 800 nm. In the embodiment, the spacing 140 is about 5 nm, but is not limited thereto. In other words, in the embodiment, the pitch 150 is about 505 nm (=5 nm+500 nm).

It is noted that the spacing 140 is the nearest distance between the adjacent transmitting column structures 11. In practical applications, the spacing 140 can be 0, and a distance not less than 0 may exist between the transmitting column structures 11. Correspondingly, when the spacing 140 is equal to 0, the pitch 150 of the transmitting column structures 11 is still between 300 nm and 800 nm.

Figure 5:
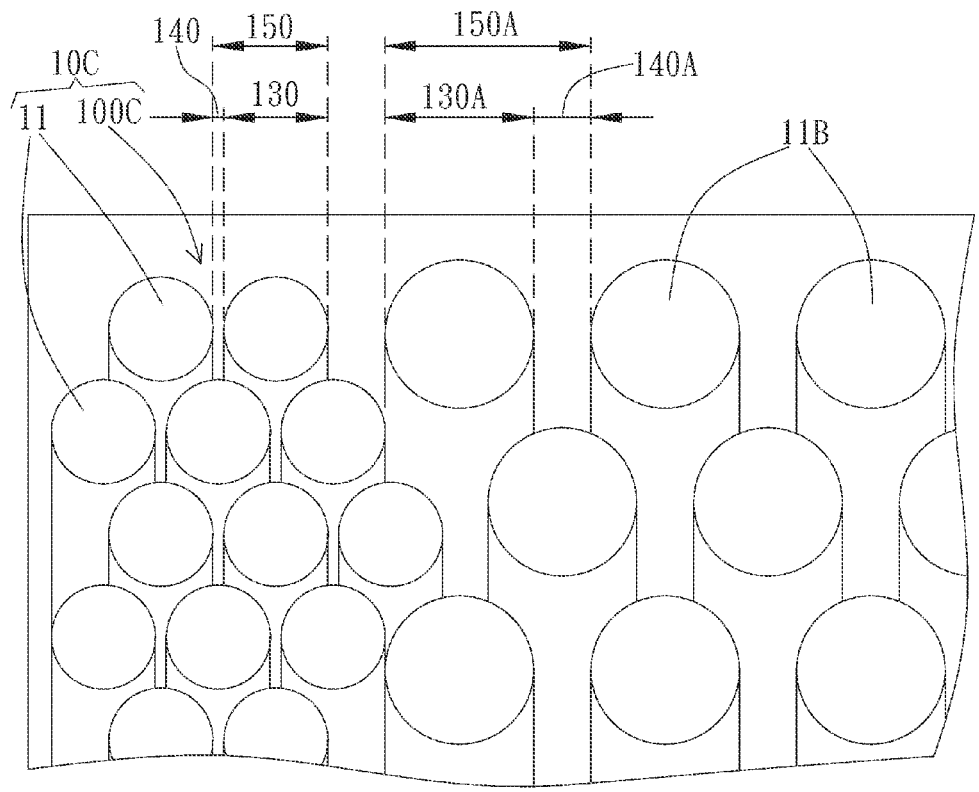
FIG. 5 is a top view of an embodiment of the optical film of the present invention.

In addition, please refer to FIG. 5; FIG. 5 is a top view of an embodiment of the optical film of the present invention. As shown in FIG. 5, the optical film 10C includes a transmission layer 100C, wherein the transmission layer 100C includes a plurality of transmitting column structures 11 and a plurality of transmitting column structures 11B. It is noted that the external diameter 130 of the transmitting column structure 11 is different from the external diameter 130A of the transmitting column structure 11B, wherein the external diameter 130A is larger than the external diameter 130. In addition, the spacing 140 of adjacent transmitting column structures 11 is different from the spacing 140A of adjacent transmitting column structures 11B, wherein the spacing 140A is larger than the spacing 140. It is noted that the pitch 150A of the transmitting column structures 11B is different from the pitch 150 of the transmitting column structures 11, but the range of the pitch 150 and the pitch 150A is still between 300 nm and 800 nm.

Please refer to FIG. 2; a longitudinal direction of the transmitting column structure 11 has a tilt angle 110 with respect to a normal of the substrate 20. In other words, each transmitting column structure 11 is obliquely disposed on the substrate 20 and has the tilt angle 110 with respect to the normal of the substrate 20. It is noted that a range of the tilt angle is between 20° and 80°. Furthermore, the tilt angle 110 is determined according to the disposition of the substrate 20. With regard to the disposition of the substrate 20, the present invention provides another embodiment to explain the details. In practical applications, the tilt angle 110 is 50°. In addition, a height 120 of the transmitting column structure 11 of each transmission layer 100 vertical to the substrate 20 is in a range between 0.1 μm and 10 μm. In the embodiment, the height 120 of the transmitting column structure 11 is 1 μm, but is not limited to the embodiment.

It is noted that when the visible light is incident to the transmitting column structures 11, the visible light is hard to enter the space between the transmitting column structures 11 and will be scattered on the surface of the transmitting column structures 11. In addition, because the visible light is hard to enter the space between the transmitting column structures 11, the visible light cannot be transmitted to the substrate 20, so that the visible light does not cause the overlapping images on the optical film 10. Consequently, the image quality is enhanced.

The present invention also provides other embodiments to further describe applicable instances of the transmitting column structure 11 as well as the advantage of high transmittance and scattering ability at certain angles.

Another embodiment according to the present invention is a head-up display device for enhancing the transmittance.

Figure 6:
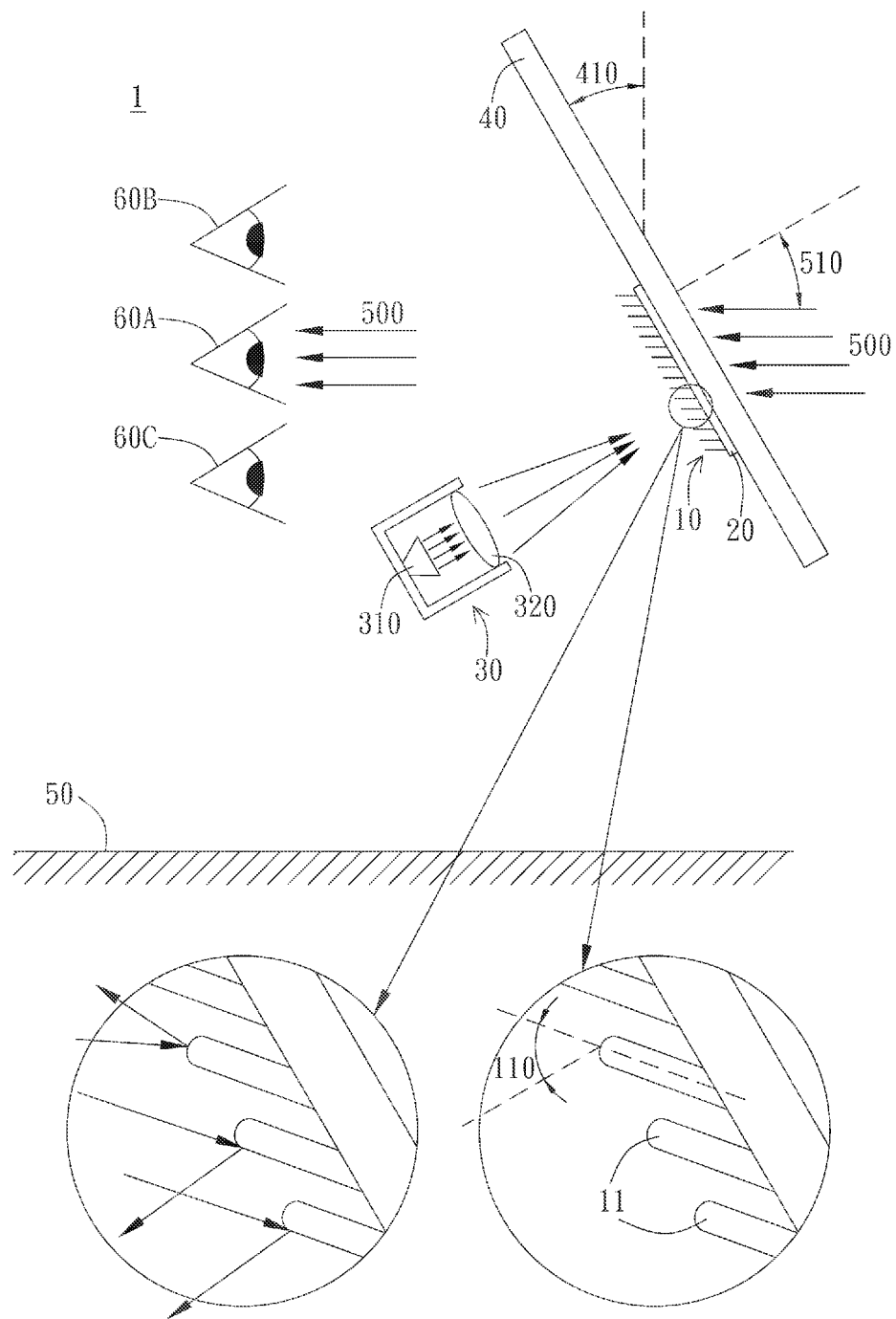
FIG. 6 is a schematic view of an embodiment of the head-up display device of the present invention.

Please refer to FIG. 6; FIG. 6 is a schematic view of an embodiment of the head-up display device 1 of the present invention. As shown in FIG. 6, the head-up display device 1 includes the optical film 10, the substrate 20, and an image module 30. It is noted that the image module 30 has an emitting source 310 and a focusing unit 320, wherein the emitting source 310 transmits at least one image. The focusing unit 320 is disposed between the emitting source 310 and the optical film 10, wherein the at least one image is focused by the focusing unit 320 and is transmitted to the optical film 10. In practical applications, the image module 30 can be a laser image module, an LED image module, or other image devices that can generate images, but is not limited thereto. The emitting source 310 can be a laser source, an LED source, or other light sources, but is not limited thereto. It is noted that the at least one image includes an image having all kinds of information, especially a traffic information image, such as real-time velocity, lamp status indication, fuel information, or other traffic information, but is not limited thereto.

In addition, the focusing unit 320 can be a focusing lens, focusing film, or other optical components having focusing function. In the embodiment, the image module 30 is an LED image device, but is not limited thereto.

As shown in FIG. 6, the substrate 20 is disposed corresponding to the image module 30 and the optical film 10 is disposed on the substrate 20. In practical applications, the substrate 20 is disposed on a display screen 40, wherein the display screen 40 can be a windshield of any suitable vehicle, but is not limited thereto. In addition, the optical film 10 is disposed to face the focusing unit 320 of the image module 30 and facilitate the display of the at least one image. With regard to detailed descriptions of the structure of the optical film 10, the optical film 10 is essentially the same as the optical film 10 shown in FIG. 1 and not elaborated hereinafter.

It is noted that the substrate 20 can be, but not limited to, a glass substrate, a plastic substrate, or other substrates manufactured from transparent materials. Furthermore, in other embodiments, the substrate 20 and the display screen 40 are integrally combined. That is, the optical film 10 can be directly disposed on the display screen 40, so that the head-up display device has the advantage of simplifying the whole design and decreasing the material cost. In practical applications, the optical film 10 is disposed on the display screen 40 by pasting or plating (coating), but is not limited thereto.

It is noted that at least one image is transmitted to the optical film 10, and the obliquely disposed transmitting column structures 11 cause the at least one image to scatter on the optical film 10. It is noted that the external diameter 130 of the transmitting column structure 11 is in the range of the wavelength of visible light, so the transmitting column structures 11 can cause visible light images or the visible light to scatter on the optical film 10. As shown in FIG. 6, when the at least one image is transmitted to the transmitting column structures 11 of the optical film 10, the at least one image is scattered by the transmitting column structures 11 and cannot be transmitted through the optical film 10 to avoid the generation of overlapping images.

In the embodiment, because the at least one image is scattered on the transmitting column structures 11, the image on the optical film 10 that is transmitted into the eyes 60A is a scattered image, instead of reflected image. In other words, even the height of the eyes 60A or the position of the eyes 60A changes, the location of the scattered image is not shifted on the optical film 10. For instance, the image seen by the eyes 60B at higher position or the eyes 60C at lower position is the scattered image, wherein the scattered image is continuously displayed on the optical film 10.

It is noted that the range of the tilt angle is between 20° and 80°, and the preferable range of the tilt angle is between 40° and 60°. In practical applications, an angle 410 is included between the display screen 40 and the normal of the ground 50, wherein the range of the angle 410 is between 10° and 70° and is preferably between 40° and 60°. In the embodiment, the angle is 50°. Furthermore, the tilt angle 110 is preferably the same as the angle 410, so that the transmitting column structures 11 are parallel to the ground 50. As such, the external light 500 that is parallel to the ground 50 can be transmitted through the optical film 10 to the eyes 60A, further enhancing the transmittance of the optical film 10.

In addition, the external light 500 and the normal of the optical film 10 have an incident angle 510. The present invention utilizes the optical film 10 to adjust the incident angle 510 to determine the transmittance of the external light 500.

Figure 7:
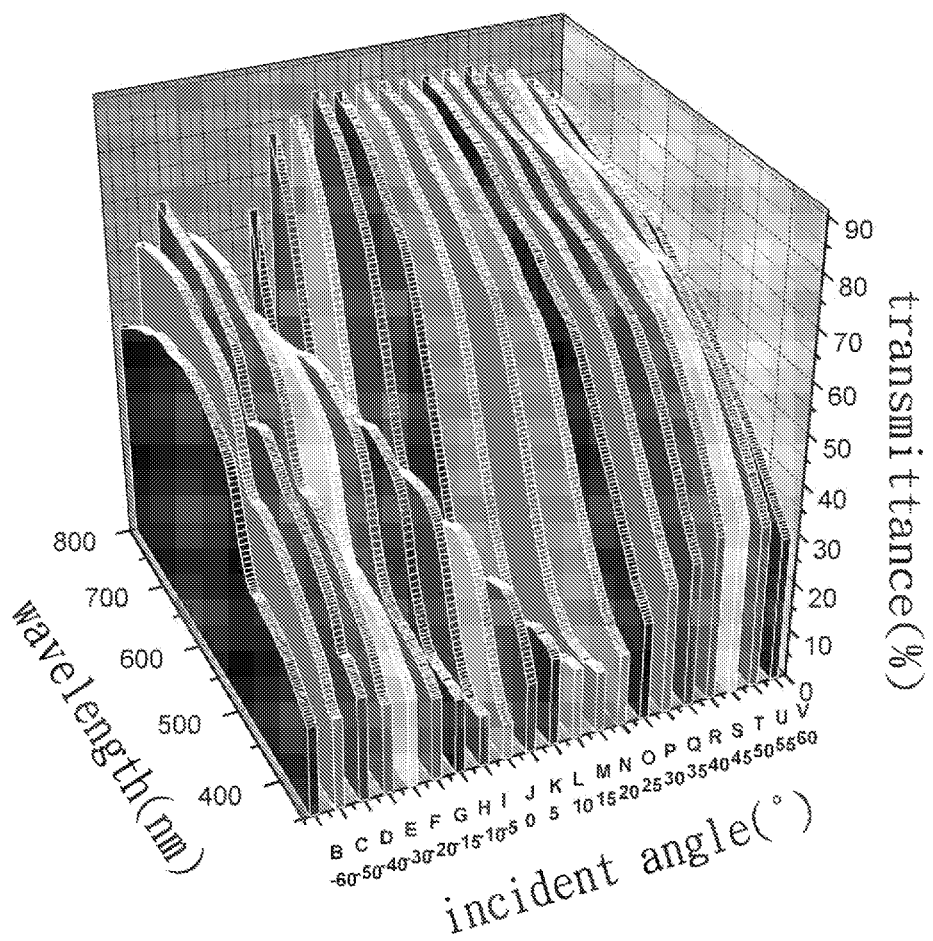
FIG. 7 is a data diagram of the transmittance and the incident angle of the present invention.

Please refer to FIG. 7; FIG. 7 is a data diagram of the transmittance and the incident angle 510 of the present invention. As shown in FIG. 7, the data diagram shows the incident angle 510 between 10° and 70°, wavelength between 400 nm and 800 nm, and the transmittance corresponding to the incident angle 510 and the wavelength. For instance, if the incident angle 510 is 30° and the wavelength is between 450 nm and 800 nm, the corresponding transmittance of the optical film 10 is between 50 through 80%. In addition, if the incident angle 510 is 50° and the wavelength is between 450 nm and 800 nm, the corresponding transmittance of the optical film 10 is between 55 through 85%. It is noted that, in the embodiment, the incident angle 510, the angle 410, and the tilt angle 110 are 50°. In other words, if the incident angle 510, the angle 410, and the tilt angle 110 are the same, the optical film 10 has a better transmittance.

Compared to the prior arts, the optical film 10 and the head-up display device 1 having the optical film 10 of the present invention utilize the transmitting column structures 11 to scatter the image, wherein the external diameter 130 of the transmitting column structure 11 is in the range of the wavelength of visible light, so that the image is scattered on the transmitting column structures 11. In addition, the external light 500 transmits through the transmitting column structures 11 along a direction almost parallel to the longitudinal direction of the transmitting column structures 11 because the transmitting column structures 11 and the normal of the substrate 20 have the tilt angle 110, further enhancing the transmittance.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An optical film applied to a substrate of a head-up display device, the optical film comprising:
   at least one transmission layer, wherein each transmission layer has a plurality of transmitting column structures obliquely arranged side by side and parallel to each other, a longitudinal direction of the transmitting column structure has a tilt angle with respect to a normal of the substrate, and one end of each transmitting column structure of one of the at least one transmitting layer is disposed on a surface of the substrate and formed obliquely away from the surface of the substrate along the longitudinal direction.

2. The optical film of claim 1, wherein a range of the tilt angle is between 20° and 80°.

3. The optical film of claim 1, wherein a range of the tilt angle is between 40° and 60°.

4. The optical film of claim 1, wherein a height of the transmitting column structure of each transmission layer vertical to the substrate is in a range between 0.1 μm and 10 μm.

5. The optical film of claim 1, wherein an external diameter of the transmitting column structure is between 300 nm and 800 nm.

6. The optical film of claim 1, wherein a shape of the transmitting column structure comprises circular column, rectangular column, or square column.

7. The optical film of claim 1, wherein a material of the transmitting column structure comprises oxide, fluoride, nitride, or any combination thereof.

8. The optical film of claim 1, wherein the transmitting column structures are disposed in a hexagonal close-packed arrangement, a rectangular arrangement, or a diamond arrangement.

9. The optical film of claim 5, wherein adjacent transmitting column structures have a same spacing.

10. The optical film of claim 5, wherein adjacent transmitting column structures have a different spacing.

11. The optical film of claim 9, wherein adjacent transmitting column structures are disposed at a pitch, wherein the pitch is a sum of the spacing and the external diameter and is between 300 nm and 800 nm.

12. The optical film of claim 10, wherein adjacent transmitting column structures are disposed at a pitch, wherein the pitch is a sum of the spacing and the external diameter and is between 300 nm and 800 nm.

13. The optical film of claim 1, wherein the at least one transmission layer is disposed in a stack manner.

14. A head-up display device, comprising:
an image module having an emitting source, wherein the emitting source transmits at least one image;
a substrate disposed corresponding to the image module; and
the optical film of claim 1;
wherein the at least one image is transmitted to the optical film, and the obliquely disposed transmitting column structures cause the at least one image to scatter on the optical film, an external light is incident from the substrate and transmits through the optical film.

15. The head-up display device of claim 14, wherein the image module further comprises:
a focusing unit disposed between the emitting source and the optical film, wherein the at least one image is focused by the focusing unit and is transmitted to the optical film.

* * * * *